Patented Aug. 18, 1936

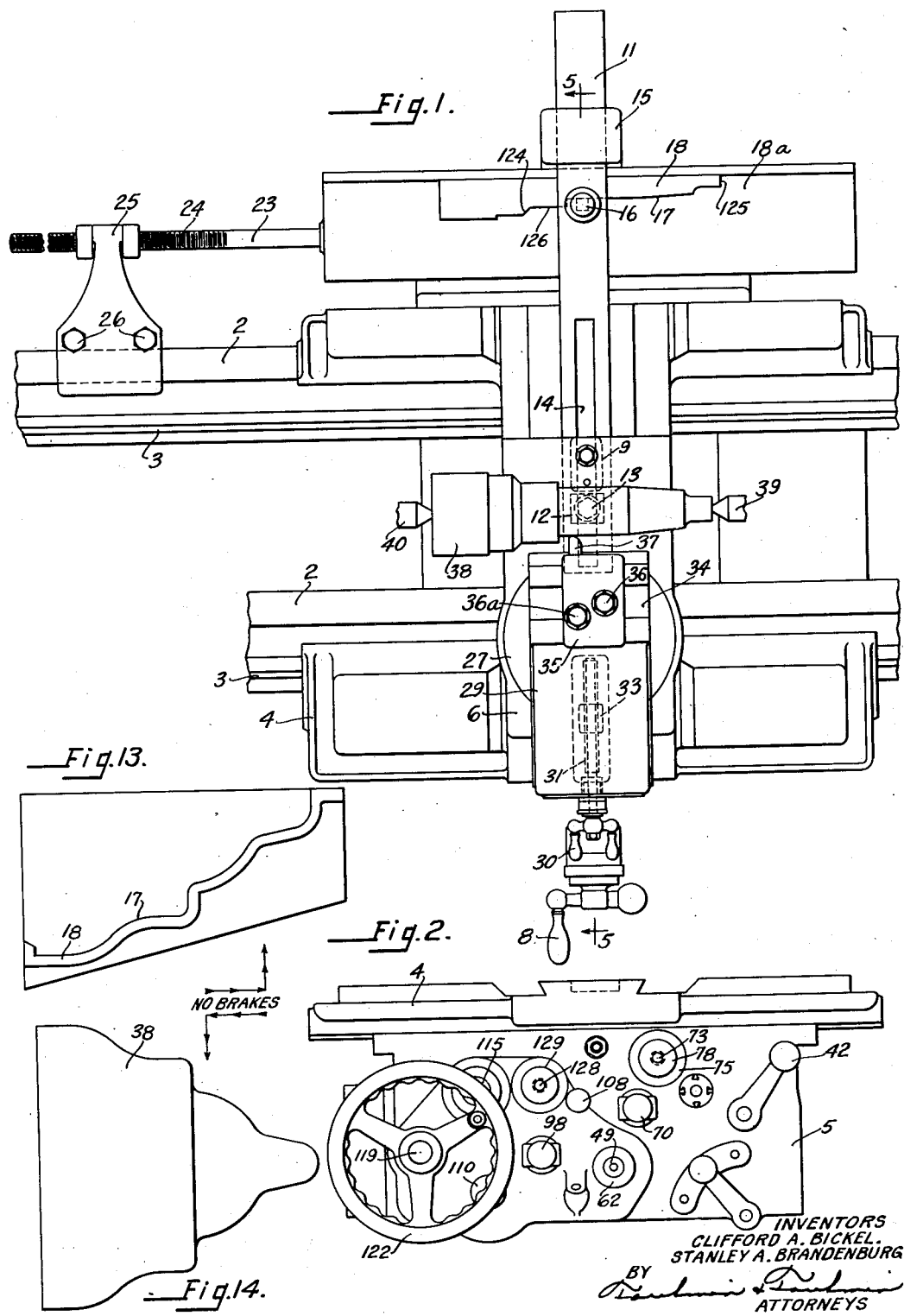

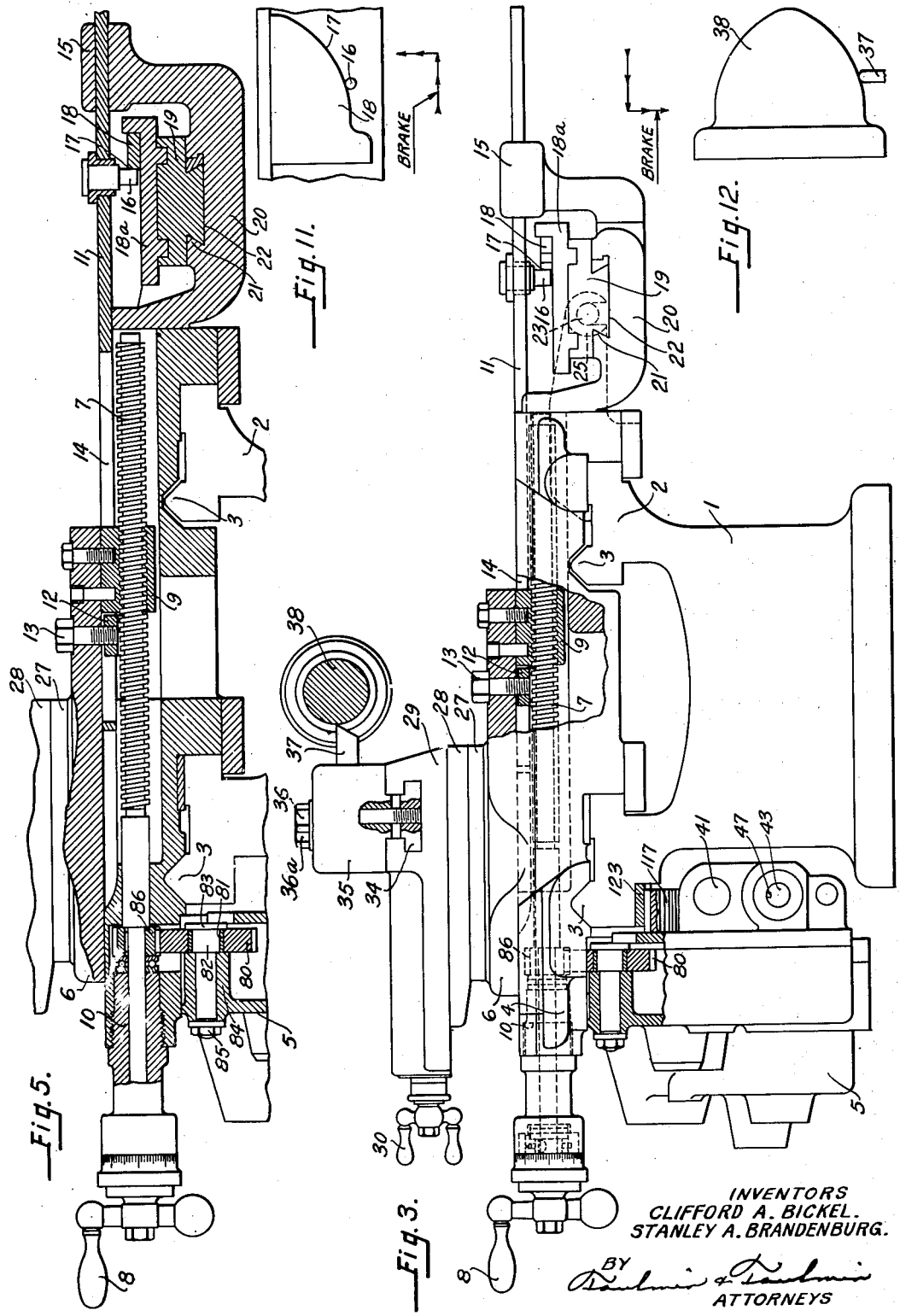

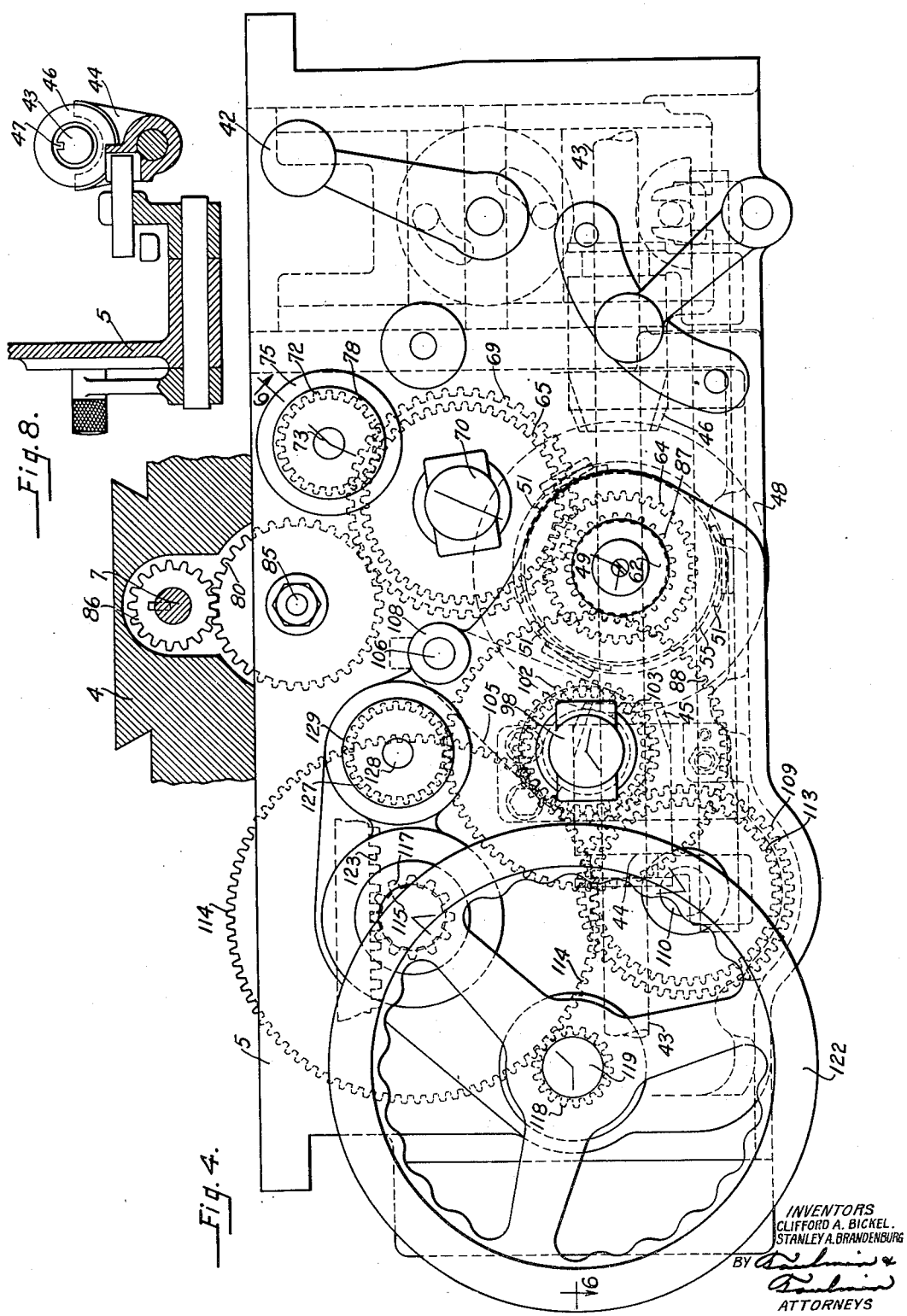

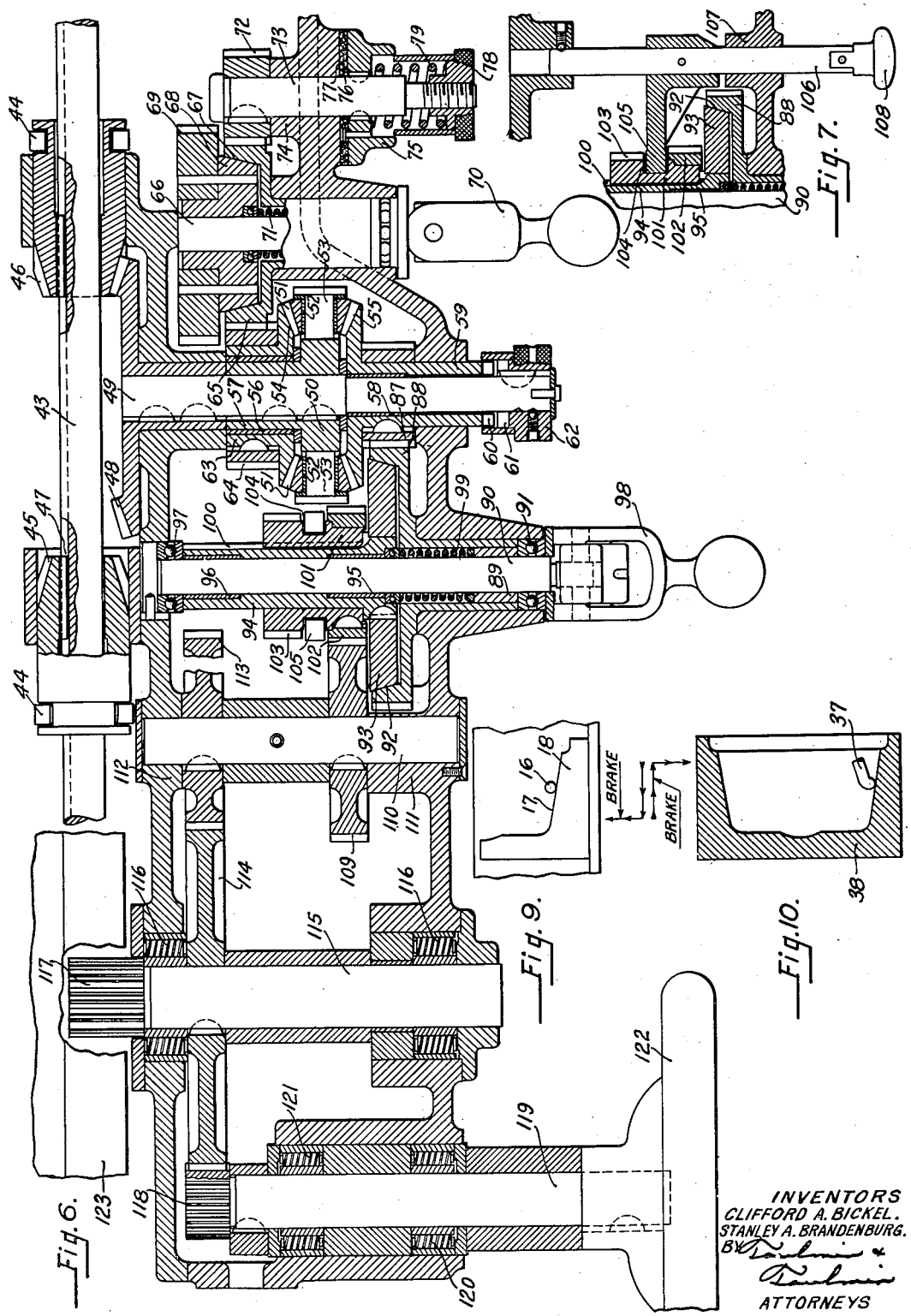

2,051,127

UNITED STATES PATENT OFFICE 2,051,127

UNIVERSAL LATHE

Clifford A. Bickel and Stanley A. Brandenburg, Sidney, Ohio, assignors to The Monarch Machine Tool Company, Sidney, Ohio, a corporation of Ohio Application April 3, 1933, Serial No. 664,150

30 Claims. (Cl. 82—14)

Our invention relates to lathes, and in particular to universal lathes wherein the motion of the cutting tool relative to the work is automatically guided.

An object of our invention is to provide a lathe wherein the cutting tool is automatically guided relative to the work which it is cutting.

Another object is to provide a lathe carriage with guiding mechanism whereby the longitudinal and cross-power feeds are operated automatically by a guiding member.

Another object is to provide such a lathe carriage having a guiding member, differential gearing interconnecting the longitudinal and cross-power feeds and a follower engaging the guiding member, thereby setting up resistance which operates the differential gearing, so that the longitudinal and cross-power feeds will be actuated in such varying proportions as to cause the cam follower and cutting tool to follow paths like or similar to the contour of the guiding member.

Another object is to provide a lathe carriage with the above-described automatic guiding mechanism by mechanical means only, as distinguished from electrical means.

Another object is to provide braking mechanisms interconnected with the longitudinal feed and also with the cross feed to permit the use of a single-sided guiding member.

Another object is to provide such mechanism as above described wherein the path of travel of the cutting tool of a lathe is controlled in such a manner from a guiding member as to create any predetermined shape or combination of shapes.

Other objects and purposes will appear from the following description taken in connection with the accompanying drawings and the appended claims.

In the drawings:

Figure 1 is a plan view of a lathe carriage on a lathe, showing the guiding member, the follower thereof, and its connection with the cutting tool and the work.

Figure 2 is a front elevation of the lathe carriage shown in Figure 1, with the carriage apron and the various controls illustrated.

Figure 3 is an end elevation, partially in section, of the lathe shown in Figure 1, with the lathe carriage and guiding mechanism in position.

Figure 4 is a detailed front elevation of the lathe carriage apron, setting forth the gearing and control relationships.

Figure 5 is a partial vertical section along the line 5—5 of Figure 1, showing the operative relationship between the parts of the cross feed and guiding mechanism.

Figure 6 is an irregular section along the line 6—6 of Figure 4, showing the gearing relationships in the lathe carriage apron.

Figure 7 is a detailed view of the shifter rod for reversing the longitudinal feed.

Figure 8 is a detailed end view of the shifting yoke for reversing the direction of the main drive on the lathe carriage.

Figure 9 is a diagrammatic plan view of a single-sided guiding member adapted to guide a cutting tool to produce a concave or internal surface.

Figure 10 is a central vertical section through a piece of work with a concave or internal surface produced by the guiding member shown in Figure 9.

Figure 11 is a diagrammatic plan view of a single-sided guiding member adapted to guide a cutting tool to produce a convex or external surface.

Figure 12 is a plan view of a piece of work having a convex or external surface produced by the guiding member of Figure 11.

Figure 13 is a diagrammatic plan view of a double-sided guiding member to produce a surface of irregular contour.

Figure 14 is a plan view of a piece of work having the irregular contour produced by the guiding member of Figure 13.

General construction

Referring to the drawings in detail, 1 is the base of a lathe having a bed 2 with longitudinal ways 3 on which travels a carriage 4. The lathe in its entirety is not a part of the invention and is, therefore, not shown. The carriage 4 contains a carriage apron 5 which extends downwardly in front of the lathe base 1, and which contains the carriage driving and feeding mechanism.

Upper carriage mechanism

Supported by the carriage 4 is the cross slide 6 which moves transversely of the lathe bed 2 under the influence of the cross feed screw 7 which may be actuated either by power mechanisms, hereinafter more fully described, or by the hand-crank 8 secured to one end of the cross feed screw 7. The cross slide 6 has attached thereto a threaded nut 9 which engages the threads of the cross feed screw 7 and imparts transverse movement to the cross slide 6 when the screw 7 is turned. The cross feed screw 7 is journaled in suitable bearings, as at 10.

A cam follower bar 11 is adjustably secured to the cross slide 6, through the agency of the bar clamp 12 held in position by the bar clamp bolt 13: the cam follower bar 11 contains a slot 14 enabling the cam follower bar to be adjusted in or out transversely as the working conditions may require. At its outer end, the cam follower bar 11 is supported by a suitable bearing member 15 through which it may slide freely in or out. Secured to the cam follower bar 11 is a cam follower 16.

The cam follower 16 engages the contact face 17 of a guiding member 18, preferably in the form of a cam or template. This guiding member 18 is mounted on a plate 18a secured to a guiding member base 19 (Figure 3) which slidably engages a supporting member 20, the slidable means shown being gibs 21 and ways 22. The guiding member base 19 is adjusted longitudinally in its ways 22 by means of the draw rod 23, which has threads 24 engaging corresponding threads in the draw rod bracket 25, which in turn is secured, as by the bolts 26, to the lathe bed 2.

Supported in swiveled relationship on the swivel plate 27 of the cross slide 6 is the compound slide rest base 28. The compound slide rest base 28 in turn slidably engages and supports the compound slide rest 29 of the ordinary type, actuated by the usual hand-crank 30 and screw shaft 31 engaging a threaded nut 33 secured to the compound slide rest base 28. Thus by turning the hand-crank 30, the compound slide rest may be moved horizontally relative to its base 28, and also turned bodily about a vertical axis by reason of the swiveled relationship existing between the compound slide rest base 28 and the swivel plate 27.

The compound slide rest 29 is provided with a slotted portion 34 which supports a tool post 35 of any suitable type held in place by the toolpost bolt 36, as is well known to those skilled in the art. Secured in the tool post 35 is a cutting tool 37 clamped therein by any suitable means, such as by the clamping bolt 36a as shown, or in a holder of the type well known in the art, which holder is in turn secured by the clamping bolt 36a.

The work 38 to be cut or turned is supported and rotated in any suitable manner as is well known in the turning art. In Figure 1 the work 38 is shown supported between the usual dead center 39 of the tailstock (not shown) and the live center 40 of the headstock (also not shown). Rotation may be imparted to the work 38 from the headstock by any suitable means such as a dog, a jawed chuck, a face plate, or a collet chuck.

Lower carriage construction

The lower carriage, called the carriage apron 5, depends vertically from the upper portion of the carriage 4 and in front of the lathe base 1. (Figure 3). Through the lathe carriage 4 passes the lead screw 41 which runs longitudinally relative to the lathe, and is actuated by gearing connected with the lathe headstock. This lead screw 41 is employed for cutting screw threads on the work piece 38, and has no direct connection with our invention. The connection between the lead screw 41 and the carriage 4 is made by means of a conventional clasp nut engaged and disengaged by the hand lever 42. (Figure 2). The details of this screw cutting mechanism are not discussed since the hand lever 42 is always set in a position disengaging the carriage 4 from the lead screw 41 while the devices of our invention are in operation.

Through the carriage 4 likewise runs a longitudinal splined shaft 43 herein designated as the feed rod. This feed rod 43 is likewise drivingly connected with the headstock of the lathe and operated by the same source of power which operates the lathe. In using the devices of our invention, the feed rod 43 is the primary driving member and may be considered as the source of power for driving the feeding mechanisms.

The carriage apron 5 contains gearing mechanisms which actuate the two power feeds of the lathe: the longitudinal feed parallel to the lathe bed ways 3 being actuated by one set of gears, and the cross feed transverse to the lathe bed ways 3 by another set of gears. Both sets of gears are driven from the feed rod 43 and interconnected in the manner now to be described.

Sliding freely on the feed rod 43, but secured by a yoke 44 to the frame of the carriage apron 5, is a pair of sliding pinions 45 and 46 rotatably driven by means engaging the spline 47 in the feed rod 43. (Figures 3 and 6). When the yoke is shifted to the left (as in Figure 6), the sliding pinion 46 engages a bevel gear 48 which is drivingly secured to the differential shaft 49, as by a key or other suitable means. When the yoke 44 is shifted to the right, the pinion 45 will drivingly engage the bevel gear 48 on its opposite side, and will thus drive the differential shaft 49 in the opposite direction. The bevel pinions 45 and 46 thus constitute a reversing device for the carriage mechanism driven from the feed rod 43.

Rigidly secured to the differential shaft 49, as by a key, is the spider 50 which thus revolves as an integral part of the differential shaft 49. Mounted for free rotation on the spider 50 is a plurality of small spider bevel pinions 51 with their axes radial to the shaft 49. The spider bevel pinions 51 rotate freely upon bearings 52 secured to the radial portions 53 of the spider 50. The spider bevel pinions 51 are equally spaced angularly with respect to each other and the shaft 49, and are in engagement with two bevel gears 54 and 55 on either side of the spider 50. The bevel gear 54 is mounted for free rotation upon a bearing 56, encircling a collar portion 57 of the spider member 50. The bevel gear 55 is likewise mounted for free rotation around the bearing 58 encircling the differential shaft 49. A sleeve portion 59 attached to the bevel gear 55 encircles the differential shaft 49 and extends outwardly through the front of the apron 5, where it engages the half member 60 of a clutch, the other half 61 of which is secured to the differential shaft 49: the two halves of the clutch may be engaged or disengaged by means of the clutch knob 62. When the clutch is disengaged, as shown in Figure 6, the bevel gears 54 and 55 are free to rotate relative to one another through the spider bevel pinions 51, whereas when the clutch halves 60 and 61 are engaged, these gears rotate as a single unit without relative rotation of the individual gears.

Transverse power feeding mechanism

The bevel gear 54 is known as the cross feed bevel gear. Secured as by a key to a collar portion 63 on the cross feed bevel gear 54 is a spur gear 64 which drivingly engages the cross feed friction gear 65. This in turn rotates around the cross feed friction shaft 66. The cross feed friction gear 65 has an internally conical portion 67 which serves as the half of a friction clutch member to engage a corresponding external conical portion 68 of a gear 69. The cross feed friction clutch halves 67 and 68 are brought into engagement or disengagement by the action of the cam handle 70 against the resistance of the spring 71 around the shaft 66.

Meshing with the cross feed friction gear 65 is a spur gear 72 drivingly secured, as by a key, to a cross feed brake shaft 73, which extends outwardly through a journal 74 in the front of the apron 5 and has keyed to its outer end a brake member 75, attached to which is a brake lining 76 bearing against a flat face 77 of a boss on the face of the apron 5. The pressure with which the brake lining 76 bears against the boss face 77 is regulated by turning the knurled cross feed brake adjusting head 78 which increases the tension of the spring 79 on the brake member 75.

Meshing with the gear 69 is an idler gear 80 (better shown in Figure 4), which rotates freely on a bearing 81 about a stub shaft 82. This stub shaft 82 has an enlarged end 83 which abuts the face of the idler gear 80, while on its other end the shaft 82 is held against the supporting arm 84 by the nut 85. Meshing with the idler gear 80 (Figures 4 and 5) is the cross feed screw pinion 86 which in turn is rigidly secured to the cross feed screw shaft 7, the nature of which has been previously described. The operative connection between the feed rod 43 through the train of gears to the cross feed screw shaft 7 has thus been traced.

Longitudinal power feeding mechanism

Returning to the bevel gear 55, hereinafter designated the longitudinal feed bevel gear, it will be noted that the sleeve portion 59 thereof has secured to it, as by a key, a longitudinal feed spur gear 87. This meshes with the longitudinal friction gear 88 rotatably mounted between the bearing 89 and apron housing 5 around the longitudinal friction shaft 90 against the ball thrust bearing 91. The longitudinal friction gear 88 contains an internal conical portion 92 forming the half of a friction clutch, engaging an external conical member 93 keyed to a sleeve 94 which rotates on bearings 95 and 96 around the longitudinal friction shaft 90 against a ball thrust bearing 97. The halves 92 and 93 of the longitudinal feed friction clutch 92—93 are engaged or disengaged by means of the longitudinal feed clutch handle 98 operating against the tension of the spring 99 around the longitudinal friction shaft 90.

Mounted for free sliding back and forth along the sleeve portion 94 of the clutch member 93, but drivingly secured thereto by the spline 100, is a longitudinal friction pinion 101 having two gear portions 102 and 103 respectively, separated from each other by the groove 104. Engaging the groove 104, as best seen from Figure 7, is a fork 105 attached to a longitudinal shifter rod 106 journaled as at 107 in the front of the carriage apron 5. The longitudinal friction pinion 101 may thus be slid to and fro along the longitudinal friction shaft 90 by pulling the longitudinal shifter rod 106 in or out by means of the knob 108. (Figures 6 and 7). At its forward position (Figure 6), the gear portion 102 of the longitudinal friction pinion 101 will be in mesh with the gear 109 keyed to the countershaft 110 which is journaled in suitable bearings 111 and 112 in the front and back walls of the carriage apron 5. Also keyed to the countershaft 110 is a second gear 113 which meshes with the rack gear 114 keyed to the rack gear shaft 115. This shaft 115 is suitably journaled in anti-friction bearings 116 in the front and back walls of the carriage apron 5 and terminates in a pinion 117 which meshes with a rack 123. Meshing with the rack gear 114 is the pinion 118 on the hand wheel shaft 119 which is suitably journaled in anti-friction bearings 120 and 121 in the walls of the carriage apron 5. Keyed to the hand wheel shaft 119 is a hand wheel 122. By turning the hand wheel 122 with the longitudinal feed friction clutch 92—93 disengaged, the carriage may be traversed longitudinally along the lathe bed.

Returning to the longitudinal friction pinion 101 on the longitudinal friction shaft 90, it will be noted that when the longitudinal shifter rod 106 (Figure 7) is pushed backward by means of the knob 108, the longitudinal friction pinion 101 will likewise move backward along the longitudinal friction shaft 90 and its gear portion 103 will directly engage the rack gear 114. This is better seen from Figure 4 rather than from Figure 6, wherein the irregularity of the section line prevents showing the idler gear 80 meshing with the gear 69 or the longitudinal friction pinion gear portion 103 meshing with the rack gear 114. The longitudinal friction pinion 101 thus serves as a reversing gear to actuate the rack gear 114, for when it is pulled into its forward position, its gear portion 102 connects the gear 88 to the rack gear 114 through the intermediate gear 109. Drivingly connected with the longitudinal feed friction gear 88 through the spur gear 127 and the stub shaft 128 is the longitudinal feed brake 129. (Figure 4). As this brake is identical in construction and operation with the cross feed brake (Figures 4 and 6), a detailed description of it would appear to be superfluous. The operative connection between the feed rod 43, through the longitudinal feed gearing to the rack 123, has thus been traced, whereby the carriage is traversed longitudinally through the agency of the power applied by the feed rod 43.

Operation of the guiding mechanism

With the work in position as shown in Figure 1, the guiding member 18 is adjusted by means of the draw rod 23 until it is in correct relationship thereto. The power is then applied and the work piece 38 is rotated, whereupon the cam follower 17 engages the edge 17 of the guiding member 18. The resistance encountered by the cam follower 17 against a flat portion 126 of the edge 17 on the guiding member 18 is opposite to the resistance encountered by the tool 37 in cutting the work piece 38, and this resistance is transmitted backward through the screw shaft 7, the pinion 86, the idler 80, the gear 69, the cross feed friction gear 65 and the cross feed bevel gear 54 to the spider pinions 51. The spider pinions 51 combined with the two bevel gears 54 and 55 act like a differential gear system, so that when the resistance reaches the cross feed bevel gear 54, the longitudinal feed bevel gear 55 is rotated more rapidly. Consequently, the transverse feed is slowed down or halted altogether, while the longitudinal feed is speeded up. If the edge portion 124 is slanting (Figure 1), neither the longitudinal nor cross feeds will be entirely halted, but the resultant motion transmitted through the interconnecting bevel gearing 51—52—53—54 will be in varying proportions according to the degree of slant, whether more nearly longitudinal or more nearly lateral. If the follower encounters a shoulder on the edge 17 of the guiding member 18, as at 125, the resistance is transmitted backward through the longitudinal feed gearing in a similar manner as that described previously for the cross feed gearing, and the longitudinal feed bevel gear 55 is halted, whereupon the cross feed bevel gear 54 is rotated more rapidly and the cross feed alone operates.

Thus the resistance of the cam follower 16 against the varying contour of the guiding member 18 is transmitted backward through the gearing mechanism to actuate the longitudinal feed alone, the cross feed alone, or a varying proportion of both feeds simultaneously. In this way the longitudinal and cross feeds will be in such varying proportions as to cause the cam follower and cutting tool to follow lines of travel like or similar to those on the contour 17 of the interferer or guiding member 18.

In order to produce this varying resistance on the cam follower, the guiding member may be a double-sided cam as shown in Figure 13. In this arrangement the follower moves between the opposite edges of corresponding patterns of the desired outline, and positive thrust is given to the follower in both of the directions in which it is capable of moving. In the manner previously described, the longitudinal and cross feeds will be caused to vary in such proportions relative to one another. The double-sided cam will, therefore, apply inversely proportional resistance to each feed. With a single-sided cam, as shown in Figures 9 and 11, the same result can be obtained by braking the feed which is not interfered with by the cam, this braking creating interference due to its friction. For example, if the longitudinal feed is not interfered with by the cam or guiding member 17, the longitudinal feed brake 129 is brought into action by adjusting its knurled head. If, on the contrary, the cross feed is not interfered with by the guiding member 17, the cross feed brake 75 is made to operate and create resistance when the operator turns the knurled head 78. By thus adjusting the longitudinal or cross feed brakes as required by the cam or guiding member 17, a single-sided guiding member will produce the same effect as a double-sided guiding member.

Typical kinds of work produced by the machine of my invention are shown in Figures 9 to 14. Figure 9 shows a cam for producing an internal or concave surface on a piece of work, the result being shown in Figure 10, with the feeding and braking directions indicated by the arrows. Figure 11 shows a cam for producing an external or convex surface on a piece of work, the result being shown in Figure 12. Figure 13 shows a double-sided cam which produces a piece of work having the configuration shown in Figure 14.

It will be understood that we desire to comprehend within our invention such modifications as may be necessary to adapt it to varying conditions and uses.

It will be understood that the clutch is mounted on the initial driving shaft and is so arranged that it can be either engaged or disengaged by hand. When it is engaged, it causes the entire arrangement of gears mounted on this shaft to be locked and will rotate as one member in the same rotary direction. When this clutch is engaged and all parts on this shaft are rotating as one member either friction or both frictions can be engaged completing the drive to either the rack pinion giving longitudinal feed or the cross feed screw giving cross feed or both. These feeds, which it has been explained, can be traveled in either direction and in all combinations to each other, will be directly proportional to the ratios of the gearing driving them. When the unit of the gear is being used in any of these manners, it is not necessary for either the longitudinal or cross feed brakes to be engaged.

If the clutch on the initial drive shaft is not engaged, the parts mounted on the shaft but not keyed to the shaft, namely, the two bevel gears and the two spur gears, are free to rotate. The two spur gears however are compelled to rotate with their respective bevel gears, since they are keyed to them. Since three bevel pinions are free to rotate on their respective mountings and since they are each meshing with both the bevel gears, if an interference should stop one of the bevel gears the bevel pinions would rotate and cause the other bevel gear to rotate at twice the speed (R. P. M.) of the initial driving shaft. Now, if the interference should be taken away from the feed that has been stopped and applied to the feed or bevel gear which is rotating, the action would be reversed, namely, the feed to which the interference has been applied would stop and the other feed or bevel gear would revolve at twice the speed of the initial driving shaft. If, however, the interference on either feed is not great enough to stop it entirely but great enough to slow it up, the other feed will increase proportionately. Thus, summing up, the pivoting or idler action of the bevel pinions on the initial driving shaft make either feed dependent on and inversely proportional to the other feed.

Utilizing this condition, it becomes possible to control the path of travel of the cutting tool of a lathe in such a manner as to create any predetermined shape or combination of shapes.

This can be done by placing a varying interference, positive or otherwise, in the path of travel of the cam follower which is mounted on or as a part of the cutting tool support. Since the cutting tool support is mounted on the unit, and the unit slides along the bed, if the cam is mounted on a support by the bed, the feeds, longitudinal and cross, will be in such carying proportions as to cause the cam follower and cutting tool to follow the lines of travel like or similar to those on the contour of the interferer or cam.

The interferer or cam can be such that inversely proportional interference can be applied to each feed and the action will be as described. This type of cam would be of the two-sided type. However, with a single sided cam the result can be effected by applying to the feed which is not interfered with by the cam a brake adjusted to create interference due to friction. This is accomplished by adjusting the previously described longitudinal feed brake or the cross feed brake as required by the cam.

Having thus described our invention, what we claim as new and desire to secure by Letters Patent is:

1. In a lathe, a carriage arranged to move longitudinally of the lathe, a cutting tool mounted on said carriage, means for feeding said cutting tool transversely of the direction of motion of said carriage, means for feeding the carriage longitudinally in the lathe, differential mechanism interconnecting said transverse feed actuating means with said longitudinal feed actuating means, a guiding member, and means for transmitting a varying resistance force from said guiding member to said differential mechanism.

2. In a lathe, a carriage arranged to move longitudinally of the lathe, a cutting tool mounted on said carriage, means for feeding said cutting tool transversely of the direction of motion of said carriage, means for feeding the carriage longitudinally in the lathe, differential mechanism interconnecting said transverse feed actuating means with said longitudinal feed actuating means, a guiding member, a guiding member follower, and means for transmitting the resistance force set up between said guiding member and said guiding member follower back to said differential mechanism whereby said longitudinal and transverse feeds will be operated in varying proportions according to the variation of the resistance force.

3. In a lathe, a lathe bed, a carriage arranged to move longitudinally along said lathe bed, a cutting tool mounted on said carriage, a guiding member and a guiding member follower arranged between said lathe bed and said cutting tool, means for feeding said cutting tool transversely to said lathe bed, means for feeding said carriage longitudinally along said lathe bed, differential gearing interconnecting said longitudinal and transverse carriage feeding means, and means for transmitting the resistance between said follower member and said guiding member to said differential gearing whereby to accelerate one of said feeding means and retard the other.

4. In a lathe, a lathe bed, a carriage arranged to move longitudinally along said lathe bed, a cutting tool mounted on said carriage, a guiding member and a guiding member follower arranged between said lathe bed and said cutting tool, means for feeding said cutting tool transversely to said lathe bed, means for feeding said carriage longitudinally along said lathe bed, differential gearing interconnecting said longitudinal and transverse carriage feeding means, and a brake adapted to retard the motion of one of said feeding mechanisms.

5. In a lathe, a lathe bed, a carriage arranged to move longitudinally along said lathe bed, a cutting tool carrier mounted on said carriage, means comprising transmission gearing for feeding said cutting tool support transversely to said lathe bed on said carriage, a cutting tool mounted on said cutting tool carrier, a follower connected with said cutting tool carrier and contacting a guiding member mounted on said lathe bed, means comprising transmission gearing for feeding said carriage longitudinally along said lathe bed, and differential gearing interconnecting said longitudinal carriage actuating means with said transverse tool carrier actuating means, whereby the resistance to said feeding motion encountered by the follower against said guiding member will be transmitted backward through said feeding mechanisms to operate said differential gearing so as to actuate said longitudinal and transverse feeds in varying proportions to one another.

6. A lathe carriage comprising a carriage bed, a tool carrier arranged to move relative to said bed, a follower connected with said tool carrier and arranged to make contact with an external guiding member, means for feeding said tool carrier relative to said carriage bed, means for feeding said carriage, and mechanism interconnecting said tool carrier moving means with said carriage moving means whereby resistance encountered by said follower against said external guiding member as transmitted backward through said feeding mechanisms will actuate said interconnecting mechanism to operate the tool carrier moving means and the carriage moving means in varying proportions.

7. A lathe carriage comprising a carriage bed, a tool carrier arranged to move relative to said carriage bed, a follower connected with said tool carrier and arranged to make contact with an external guiding member, means comprising transmission gearing for moving said tool carrier relative to said carriage bed, means comprising transmission gearing for moving said carriage, differential transmission mechanism interconnecting said tool carrier moving mechanism with said carriage moving mechanism, and means for transmitting the resistance between said follower member and said guiding member to said differential gearing whereby to accelerate one of said feeding means and retard the other.

8. A lathe carriage comprising a carriage bed, a tool carrier arranged to move relatively to said carriage bed, a follower connected to said tool carrier and arranged to make contact with an external guiding member, means for moving said tool carrier relative to said carriage bed, an apron attached to said carriage bed, mechanism contained in said apron to actuate said tool carrier moving means, mechanism contained in said apron for moving said carriage as a whole, and differential mechanism interconnecting said tool carrier moving mechanism with said carriage moving mechanism, said differential mechanism being connected with an external source of power.

9. A lathe carriage comprising a carriage bed, a tool carrier arranged to move relatively to said carriage bed, a follower connected to said tool carrier and arranged to make contact with an external guiding member, means for moving said tool carrier relative to said carriage bed, an apron attached to said carriage bed, mechanism contained in said apron to actuate said tool carrier moving means, mechanism contained in said apron for moving said carriage as a whole, and an externally actuated differential gearing assembly interconnecting said tool carrier actuating mechanism with said carriage actuating mechanism.

10. A lathe carriage comprising a carriage bed, a tool carrier arranged to move relatively to said carriage bed, a follower connected to said tool carrier and arranged to make contact with an external guiding member, means for moving said tool carrier relative to said carriage bed, an apron attached to said carriage bed, mechanism contained in said apron to actuate said tool carrier moving means, mechanism contained in said apron for moving said carriage as a whole, an externally actuated differential gearing assembly interconnecting said tool carrier actuating mechanism with said carriage actuating mechanism, said differential gearing mechanism comprising twin gears including a gear drivingly connected with said tool carrier moving mechanism, an independently rotatable gear drivingly connected with said carriage moving mechanism, and freely rotatable idler pinions inter-meshing between said twin gears.

11. An apron for a lathe carriage including transverse feeding mechanism drivingly connected with a transverse feeding screw, longitudinal feeding mechanism drivingly connected with an externally mounted longitudinal feeding member, and differential gearing interconnecting said transverse feeding mechanism with said longitudinal feeding mechanism, said differential gearing being drivingly connected to an external source of power, whereby resistance to the feeding motions transmitted backward through said feeding mechanisms will actuate said differential gearing to vary the proportional feeding speeds of said longitudinal and transverse feeding mechanisms.

12. An apron for a lathe carriage including transverse feeding mechanism drivingly connected with a transverse feeding screw, longitudinal feeding mechanism drivingly connected with an externally mounted longitudinal feeding member, differential gearing interconnecting said transverse feeding mechanism with said longitudinal feeding mechanism, said differential gearing comprising a pinion carrier drivingly connected to an external source of power, pinions freely rotatable on said pinion carrier, and independently rotatable twin gears meshing with said pinions, one of said twin gears being drivingly connected with said longitudinal feeding mechanism, the other of said twin gears being drivingly connected to said transverse feeding mechanism.

13. An apron for a lathe carriage including transverse feeding mechanism having a transverse feeding screw drivingly connected thereto, longitudinal feeding mechanism drivingly connected with an externally mounted longitudinal feeding member, differential gearing interconnecting said transverse feeding mechanism with said longitudinal feeding mechanism, said differential gearing comprising a pinion carrier drivingly connected to an external source of power, pinions freely rotatable on said pinion carrier, independently rotatable twin gears meshing with said pinions, one of said twin gears being drivingly connected with said longitudinal feeding mechanism, the other of said twin gears being drivingly connected to said transverse feeding mechanism, and a braking member drivingly connected to one set of said feeding mechanisms.

14. An apron for a lathe carriage including transverse feeding mechanism having a transverse feeding screw drivingly connected thereto, longitudinal feeding mechanism drivingly connected with an externally mounted longitudinal feeding member, differential gearing interconnecting said transverse feeding mechanism with said longitudinal feeding mechanism, said differential gearing comprising a pinion carrier drivingly connected to an external source of power, pinions freely rotatable on said pinion carrier, independently rotatable twin gears meshing with said pinions, one of said twin gears being drivingly connected with said longitudinal feeding mechanism, the other of said twin gears being drivingly connected to said transverse feeding mechanism, a longitudinal feed brake drivingly connected with said longitudinal feeding mechanism, and a transverse feed brake drivingly connected with said transverse feeding mechanism.

15. An apron for a lathe carriage including transverse feeding mechanism having a transverse feeding screw drivingly connected thereto, longitudinal feeding mechanism drivingly connected with an externally mounted longitudinal feeding member, differential gearing interconnecting said transverse feeding mechanism with said longitudinal feeding mechanism, said differential gearing comprising a pinion carrier drivingly connected to an external source of power, pinions freely rotatable on said pinion carrier, independently rotatable twin gears meshing with said pinions, one of said twin gears being drivingly connected with said longitudinal feeding mechanism, the other of said twin gears being drivingly connected to said transverse feeding mechanism, and a clutch whereby said twin gears may be interconnected to rotate together as a unit.

16. A tool carrier for a lathe comprising a tool slide member, means for moving said tool slide member in and out, means for moving it longitudinally, a cam follower attached to said tool slide member, said cam follower being arranged to make contact with a guiding member, a cutting tool mounted on said tool slide member, and means controlled by the resistance between the cam and cam follower for adjusting the extent of movement of the cam follower and tool with the tool slide and the respective longitudinal and transverse directions.

17. A tool carrier for a lathe comprising a tool slide member, means for moving said tool slide member, guiding mechanism engaging said tool slide member having means to resist its longitudinal and transverse movements, and a cutting tool mounted on said tool slide member, and differential gearing interconnecting longitudinal and cross feed mechanisms so that the longitudinal and cross feeds will be actuated in such varying proportions as to cause the cutting tool to follow the contour of the guiding mechanism.

18. A tool carrier for a lathe comprising a tool slide member, means for moving said tool slide member, a cam follower support attached to said tool slide member, a cam follower carried by said cam follower support, said cam follower being arranged to make contact with an externally mounted guiding member, and a cutting tool mounted on said tool slide member, and a carriage carrying the tool slide, an apron on the carriage, a lead screw actuating the carriage, a feed rod actuating the tool slide, differential gearing interconnecting the longitudinal and cross feeds of the lead screw and feed rod whereby when the resistance of the cam follower meeting the guiding member is sufficient it will operate the differential gearing so that the longitudinal and cross feeds will be actuated in such varying proportions as to cause the cam follower and cutting tool to follow paths similar to the contour of the guiding member.

19. In a lathe, means for feeding a cutting tool longitudinally, means separate from said longitudinal feeding means for feeding a cutting tool transversely, means to retard one of said means while causing the other to function whereby the movement of the cutting tool will be predominantly longitudinal or transverse in direction of movement, said last-named means comprising a guiding member and a differential gear connection connecting the first and the second means and means for transmitting the resistance between said follower member and said guiding member to said differential gearing whereby to accelerate one of said feeding means and retard the other.

20. In a lathe, means for feeding a cutting tool longitudinally, means separate from said longitudinal feeding means for feeding a cutting tool transversely, means interrelating the longitudinal and transverse feeds and adapted to retard one of said feeding means while causing the other feeding means to be advanced whereby the movement of the cutting tool will be predominantly longitudinal or transverse in direction of movement, and means adapted to control the retarding means to determine the proportionate extent of the respective longitudinal and transverse movements of the tool.

21. In a lathe, a cutting tool, means for feeding the cutting tool longitudinally, means for feeding the cutting tool transversely, means interrelating the longitudinal and transverse feeds and adapted to retard one of said feeding means while causing the other feeding means to be advanced whereby the movement of the cutting tool will be predominantly longitudinal or transverse in direction of movement, means adapted to control the retarding means to determine the proportionate extent of the respective longitudinal and transverse movements of the tool, and means to reverse the direction of movements of the tool.

22. In combination, a tool, means for moving the tool longitudinally, means for moving the tool transversely, mechanism operatively interconnecting said longitudinal and transverse feeding means, braking means adapted to retard one of said feeding means while permitting the other to operate unretardedly, guiding means arranged according to the shape of the path to be followed by the tool, and means engaging said guiding means and operatively connected to said braking means, said mechanism being adapted to proportionately interrelate the longitudinal and transverse movements of the tool according to the configuration of said guiding means, whereby to cause the tool to cut a shape corresponding to that of the guiding means.

23. In combination, a tool, means for feeding the tool longitudinally, means separate from said longitudinal feeding means for feeding the tool transversely, interfering means interposed to interconnect and vary the proportionate extent of the longitudinal and transverse movements of said tool, said interfering means being adapted to retard one of said feeding means while operating the other whereby to cause the tool to move in a path longitudinally and transversely in proportion to the varied interference of said means.

24. In combination, a tool, means for feeding the tool longitudinally, means separate from said longitudinal feeding means for feeding the tool transversely, interfering means interposed to interconnect and vary the proportionate extent of the longitudinal and transverse movements of said tool, said interfering means being adapted to retard one of said feeding means while operating the other whereby to cause the tool to move in a path longitudinally and transversely in proportion to the varied interference of said means, said interfering means being arranged to apply an inversely proportionate interference to each feeding means.

25. In combination, a tool, means for feeding the tool longitudinally, means separate from said longitudinal feeding means for feeding the tool transversely and interposing an interfering means to the movements of the tool driving means, the variations of which will serve to retard said respective driving means and cause the tool to move in a path longitudinally and transversely in proportion to the varied interference of said means, and arranging said interference means so that an inversely proportionate interference can be applied to each driving means, and effecting the proportional interference with said means by proportionately braking the driving means which is to be retarded, while proportionately increasing the movement of the means that is not so retarded.

26. In combination, a tool, means for feeding the tool longitudinally, means separate from said longitudinal feeding means for feeding the tool transversely, and feed-proportioning mechanism operatively connected to both of said feeding means, said mechanism being adapted to control the tool movement by simultaneously retarding one of the feeding means while proportionately increasing the movement of the other feeding means.

27. In combination in a lathe, a tool, a planetary feeding means, feed means adapted to interconnect separate mechanism assemblies for feeding the tool longitudinally and transversely through the planetary feeding means, braking means for selectively braking the means for feeding the tool longitudinally and transversely, a cam means for controlling the application of the braking means so as to cause the tool to cut a work piece of the same configuration as the cam.

28. In combination in a lathe, a tool, a planetary feeding means, feed means adapted to interconnect separate mechanism assemblies for feeding the tool longitudinally and transversely through the planetary feeding means, braking means for selectively braking the means for feeding the tool longitudinally and transversely, a cam means for controlling the application of the braking means so as to cause the tool to cut a work piece of the same configuration as the cam, said feeding means being so arranged that the extent of braking of one of the feeding means proportionately increases the extent of feed of the unbraked feeding means.

29. In combination, a tool, a planetary feeding means, means operating through the planetary feeding means for moving the cutting tool longitudinally, means operating through the planetary feeding means separate from said longitudinal feeding means for moving the cutting tool transversely, means connected to the tool comprising a follower pin and a slotted cam to provide a varying interference adapted to interfere with the means to drive the tool selectively longitudinally and transversely, said interference means providing an inversely proportionate interference applied to each feeding means.

30. In combination, in a lathe of a lathe bed, a carriage, a feed rod, an apron on said carriage, a tool slide and cutting tool mounted on said carriage, a template mounted on said tool bed, a template follower mounted on said tool slide engaging said template, planetary gearing mounted on said apron of the carriage, braking means on said carriage associated with said gearing, the resistance of the cam follower on the template being adapted to control the extent of braking of the planetary gearing in order to determine the longitudinal or transverse movement selectively according to the shape of the template.

CLIFFORD A. BICKEL.
STANLEY A. BRANDENBURG.